US012728484B2

(12) United States Patent
Ponzio et al.

(10) Patent No.: US 12,728,484 B2
(45) Date of Patent: Sep. 8, 2026

(54) METHOD AND DEVICE FOR LASER WELDING CONDUCTOR WIRES

(71) Applicant: ATOP S.p.A., Barberino Tavarnelle (IT)

(72) Inventors: Massimo Ponzio, Colle Val d' Elsa (IT); Rubino Corbinelli, Staggia Senese (IT); Daniele Nocciolini, Florence (IT)

(73) Assignee: ATOP S.p.A., Barberino Tavarnelle (IT)

( * ) Notice: Subject to any disclaimer, the term of this patent is extended or adjusted under 35 U.S.C. 154(b) by 631 days.

(21) Appl. No.: 18/251,435

(22) PCT Filed: Dec. 22, 2021

(86) PCT No.: PCT/EP2021/087182

§ 371 (c)(1),
(2) Date: May 2, 2023

(87) PCT Pub. No.: WO2022/136488

PCT Pub. Date: Jun. 30, 2022

(65) Prior Publication Data

US 2024/0017354 A1 Jan. 18, 2024

(30) Foreign Application Priority Data

Dec. 22, 2020 (EP) .................................... 20216262

(51) Int. Cl.
*B23K 26/21* (2014.01)
*B23K 26/082* (2014.01)
(Continued)

(52) U.S. Cl.
CPC ............ *B23K 26/21* (2015.10); *B23K 26/082* (2015.10); *H02K 15/062* (2013.01); *B23K 2101/38* (2018.08)

(58) Field of Classification Search
CPC .. B23K 26/21; B23K 26/082; B23K 2101/38; B23K 2103/12; B23K 26/242;
(Continued)

(56) References Cited

U.S. PATENT DOCUMENTS 10,717,153 B2 * 7/2020 Nakamura ............. H01R 4/021
2011/0132878 A1 * 6/2011 Wang ................. B23K 26/1423 219/121.64

(Continued)

FOREIGN PATENT DOCUMENTS

EP 3292940 3/2018
JP 2018030155 3/2018

*Primary Examiner* — Justin C Dodson
*Assistant Examiner* — Keith Brian Assante
(74) *Attorney, Agent, or Firm* — HG Law LLP; Jeffrey H. Ingerman

(57) ABSTRACT

The present invention relates to a method for laser welding conductor wires (5, 7), in particular conductor wires (5, 7) arranged in slots (2) of a core (3) of a dynamo electric machine, such as a stator core, to form a winding and a device (35) for laser welding conductor wires (5, 7). A first end (4) of a first conductor wire (5) and a second end (6) of a second conductor wire (7) are arranged adjacent to each other. A laser beam is applied to a first end surface (8) of the first conductor wire (5) and a second end surface (10) of the second conductor wire (7) to weld together the first end (4) of the first conductor wire (5) and the second end (6) of the second conductor wire (7). The first end surface (8) and the second end surface (10) point upwards, preferable the first end surface (8) and the second end surface (10) are axial end surfaces. A laser beam (31) is applied in a first substantially closed path (21) within the first end surface (8) to form a first molten pool (25). The laser beam (31) is applied in a second substantially closed path (22) within the second end surface (10) to form a second molten pool (26). The laser beam (31) is applied in a third substantially closed path (23) to the first (Continued)

Figure 1:
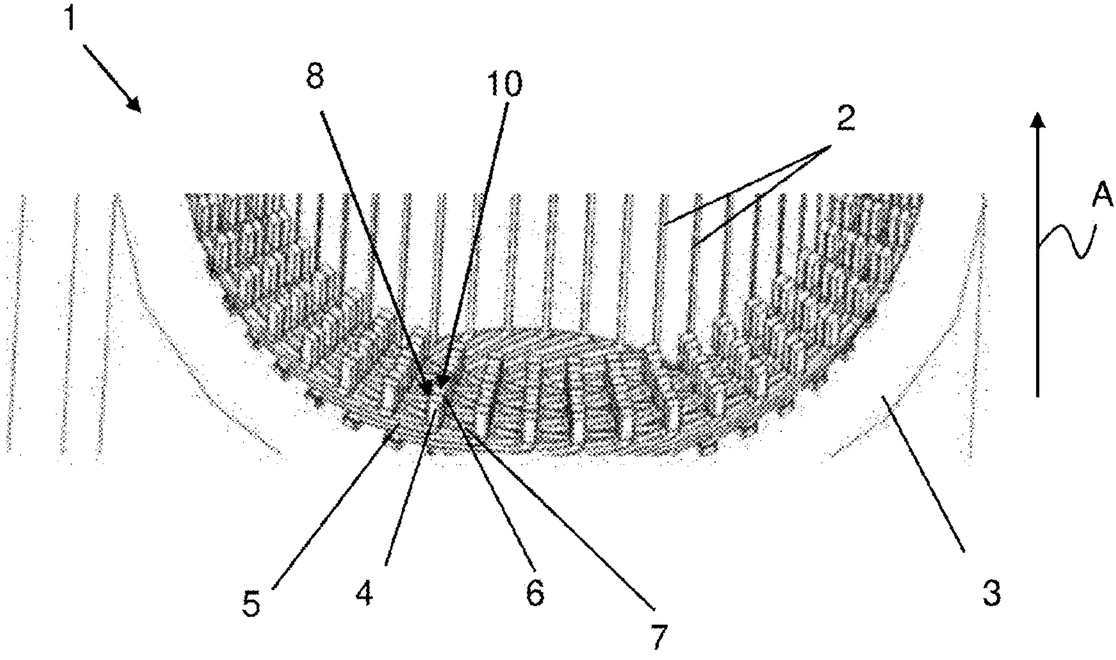

end surface (8) and to the second end surface (10) connecting the first and second molten pool.

13 Claims, 3 Drawing Sheets

(51) Int. Cl.
*B23K 101/38* (2006.01)
*H02K 15/062* (2025.01)

(58) Field of Classification Search
CPC .... B23K 26/28; B23K 26/32; B23K 2101/32; H02K 15/062; H02K 15/35
See application file for complete search history.

(56) References Cited

U.S. PATENT DOCUMENTS

2014/0263195 A1* 9/2014 Shuck ................ B23K 15/0086 219/76.14
2018/0036836 A1* 2/2018 Nakamura ......... B23K 26/0736
2019/0240780 A1* 8/2019 Yang .................... B23K 26/244

* cited by examiner

METHOD AND DEVICE FOR LASER WELDING CONDUCTOR WIRES

CROSS-REFERENCE TO RELATED APPLICATIONS

This application is a national stage application under 35 U.S.C. § 371 of International Application No. PCT/EP2021/087182, filed Dec. 22, 2021, which claims the benefit of and priority from European Patent Application No. 20216262.4, filed Dec. 22, 2020, the contents of each of which are hereby incorporated by reference herein in their entireties.

The present invention relates to a method for laser welding conductor wires, in particular conductor wires arranged in slots of a core of a dynamo electric machine, such as a stator core, to form a winding and a device for laser welding conductor wires.

A stator of a motor includes a stator core and a plurality of segment coils that are arranged in slots of the stator core. The segment coils may be formed by a conductor wire, in particular a flat wire made of copper and coated with an insulating film.

The conductor wire may be provided by pin conductors, such as I-pin or hairpin conductors, which may be inserted into the slots of the stator core from one axial side of the stator core.

Hairpin conductors are typically provided with two legs and a bridge portion joining the two legs. One leg is inserted into one slot. The bridge portions extend axially outward of the stator on one axial side of the stator core whereas the legs extend out of the slots on the opposite axial side of the stator core. I-pin conductors only comprise one leg.

By mutually connecting two of the extending legs, a continuous conductor similar to a winding can be created.

Ends of the pin conductors are joined to one another by welding to form a stator winding. For example, plasma welding, resistance welding or tungsten inert gas welding may be used here.

Laser beam welding is often used on account of high possibilities for precision of the weld, automation and low cycle times.

Coupling the laser beam into the material produces a melt, which leads to the components being connected to one another. In order to prevent damage to the laser source due to feedback effects, an oblique positioning of the laser beam or the components by at most 0-15° to one another can be made, depending on the manufacturer of the laser source.

However, due to stripping off an insulating film from the ends of the pin conductors, there may be a clearance between adjacent side surfaces even when the pin conductors are clamped together.

EP3292940 A1 discloses to apply a laser beam to a first end surface of a first flat wire and a second end surface of a second flat wire to weld together the first side surface and the second side surface. The laser beam is applied inside the first end surface and at the same time inside the second end surface while gradually increasing the diameter of a loop-shaped trajectories of the laser beam to allow the molten pools to reach a first side surface and a second side surface butted together. Thereby, a clearance between the first and the second flat wire may be filled by material of both flat wires.

JP2018-30155 A discloses a laser welding method of a flat wire. including scanning the inside of an end face of a first flat wire with a laser beam in a loop shape to form a first molten pool which reaches the second flat wire and scanning the inside of the end face of the second flat wire in a loop shape to form a second molten pool which reaches the first flat wire and the first molten pool. The gap between the wires is filled with material from only one of the wires.

US2020067388A1 discloses that the conductor ends are inclined in relation to a perpendicular direction. This leads to the bridge formed by laser welding running between the first conductor and the second conductor obliquely to the axial direction. Due to gravity, the melt may bridge a gap between the conductor ends.

According to US20170257002 A1 slits may be formed in the ends of the conductors, such that melting can be achieved with a reduced heat input.

US20200083787 A1 teaches to scan the laser beam in a plurality of continuous loop shapes from one or both welding end portions.

Ends of conductor wires may be sharpened for easier insertion into the slots of the core of a dynamo electric machine. The ends of the conductor wires then do not comprise a flat surface, such that the laser beam does not have a homogenous power distribution over the end surface due to different distances and to the fact that the clearance between two sharpened ends varies along the axial length of the conductor wires. The ends may be cut off before laser welding to provide flat ends. However, copper material is wasted in this case.

It is therefore an object of the present invention to overcome the disadvantages of the prior art and in particular to provide a method and an apparatus for laser welding conductor wires which allow a fast and reliable connection of ends of conductor wires.

According to the present invention, these and other objects are solved with a method and an apparatus according to the independent patent claims.

The method according to the invention is used for laser welding conductor wires. A first end of a first conductor wire and a second end of a second conductor wire are arranged adjacent to each other. Preferably at least axially extending parts of the conductor wires abut against each other, for example by using a pressing tool for pressing in radial and/or circumferential direction.

In particular the conductor wires are arranged in slots of a core of a dynamo electric machine, such as a stator core or an armature or rotor core, to form a winding when they are connected.

Within this application the terms axial, circumferential and radial refer to the geometry of the core.

A laser beam is applied to a first end surface of the first conductor wire delimited by a first radial surface and a second end surface of the second conductor wire delimited by second radial surface to weld together the first end of the first conductor wire and the second end of the second conductor wire.

The first radial surface and the second radial surface may be opposite each other. The first radial surface and the second radial surface may delimit a gap between the first conductor wire and the second conductor wire.

Before welding a first side surface of the first end of the first conductor wire and a second side surface of the second end of the second conductor wire face each other and preferably touch each other.

Preferably, the adjacent conductor wires are neighbours in a radial direction, such that the first side surface is a first radial surface and the second side surface is a second radial surface, which face each other.

The first end surface and the second end surface preferably point upwards.

The first end surface and the second end surface preferably each comprise a substantially vertical face normal. That means the mean value of face normal is within an angle of +/−10° towards the gravity vector.

Preferably a core of a dynamo electric machine hosting the conductor wires is arranged such the core axis is directed vertically and the core axis is aligned with the gravity vector.

The first end surface and the second end surface may point axially. The first end surface and the second end surface may have a substantially axial face normal. The first side surface and the second side surface may face radially.

Alternatively, the ends of the conductor wires may point in radial or circumferential direction.

For example the ends of the conductor wires may be bent towards the outside or inside of the core. In this case the first end surface and/or the second end surface against which the laser beam is directed may be parts of the side faces of the conductor wires facing radially. The first side surface and the second side surface may then face circumferentially.

Alternatively, the conductor wires may be bent towards the outside or inside of the core and the first end surface and/or the second end surfaces against which the laser beam is directed may point also to the outside or inside of the core.

Alternatively, the core of a dynamo electric machine hosting the conductor wires may be arranged such the core axis is arranged at an angle, for example perpendicularly, to the gravity vector. In this case, the first end surface and/or the second end surface against which the laser beam is directed may be parts of the side faces of the conductor wires. In this case, the first end surface and/or the second end surface of two radially adjacent conductor wires to be connected may face circumferentially and at the same time point upwards.

Preferably at least one laser tool for generating the laser beam and/or for guiding the laser beam is arranged above the first end surface and the second end surface.

The laser tool may also be arranged next to end surfaces facing in a radial direction such that an essentially horizontally arranged welding beam may be applied to end surfaces pointing for example radially.

In a first step (i) the laser beam is applied within the first end surface in a first substantially closed path to form a first molten pool. Within this application "substantially closed" means that the path encompasses at least an angle of 270° and preferably is completely closed.

As the first substantially closed path is within the first end surface, said first molten pool does not reach said first radial surface of said first conductor wire.

In a second step (iia) the laser beam is applied within the second end surface in a second substantially closed path to form a second molten pool.

Preferably the second step is performed subsequently to the first step and by the same laser tool. Alternatively, the first step (i) and the second step (ii) may be performed simultaneously.

As the second substantially closed path is within the second end surface, said second molten pool does not reach said second radial surface of said second conductor wire.

As the first and the second end surface preferably point upwards, the horizontal surface of the molten pool may remain stationary within the respective conductor wire.

The diameter of the substantially closed path and/or second substantially closed path may be smaller than half of the diameter of the conductor wires or may be smaller than half of the shorter length of a rectangular contour of the conductor wire. The laser beam is applied in a third step (iii) to the first end surface and to the second end surface in a path from the first molten pool to the second end surface.

Preferably, the third step (iii) is performed subsequently to the first step (i) and before the second step (ii).

The third step (iii) may be performed by the same laser tool as step (i) and step (ii).

Preferably, the laser beam is applied in a straight path. The laser beam may create a molten line, along which material may flow from the first molten pool into the region between the two conductor wires. Thus, material may be transferred from the first pool towards the second end, especially into a gap between the two conductor wires.

Alternatively or additionally with respect to the third step, in a fourth step the laser beam may be applied to the first end surface and to the second end surface in a third substantially closed path connecting the first and second molten pool.

Preferably, the fourth step (iv) is performed subsequently to the first step (i) and the third step (iii) and more preferably to the second step. The fourth step (iv) may be performed by the same laser tool as step (i) and step (ii), and preferably as step (iii).

Alternatively, the first step (i) is performed and subsequently the laser beam is applied on a path corresponding to the first part of the third substantially closed path which starts at the first molten pool and ends on the second end surface. After that, the second step (ii) is performed and subsequently the third substantially closed path is completed.

By the third substantially closed path the first and the second molten pool may be joined to a common molten pool, which connects the first end of the first conductor wire and the second end of the second conductor wire as soon as the common molten pool has been cooled and solidified.

Thus, after applying a laser beam in a first substantially closed path within the first end surface to form a first molten pool the laser beam may be applied in a second substantially closed path within the second end surface to form a second molten pool in a step (iia) and subsequently the laser beam may be applied in a step (iiia) in a path starting at the first molten pool to the second end surface and/or in a third substantially closed path to the first end surface and to the second end surface thereby connecting the first and second molten pool.

In step (iia) the second molten pool is formed by a second laser beam in such a way that said second molten pool do not impinge said second radial surface of said second conductor wire.

In step (iiia) a crossing laser beam is applied to form a connecting path starting at the first molten pool towards the second end surface crossing the first radial surface and the second radial surface until impinging said second molten pool.

Alternatively, after applying a laser beam in a first substantially closed path within the first end surface to form a first molten pool the laser beam may be guided to the second end surface in a step (iiib), by applying the laser beam in a path starting at the first molten pool to the second end surface and/or in a third substantially closed path to the first end surface and to the second end surface. Subsequently, in a step (iib) the laser beam may be applied in a second substantially closed path within the second end surface to form a second molten pool, such that the path and/or the third substantially closed path connects the first molten pool and second molten pool.

In step (iiib) a crossing laser beam is applied in a connecting path starting at the first molten pool towards the second end surface crossing the first radial surface and the second radial surface.

In step (iib) the second molten pool is formed by a second laser beam in such a way that said second molten pool do not impinge said second radial surface of said second conductor wire, and said second molten pool impinges said connecting path on the second end surface.

In both cases molten pools within the respective wires are connected by a connection path, such that via the connection path material from both wires may get into the gap between the wires.

As in both cases molten pools are formed within the first and second end surfaces which do not impinge the respective radial surface, it is avoided that material from only one wire fills the gap between the wires.

In particular the conductor wires are flat wire conductors having a rectangular cross-section. The axial end faces may have a rectangular shape and are for example flat.

The first and/or the second conductor wire may be the leg of pin conductor, such as a hairpin or an I-pin.

The radial surface and/or the circumferential surface of the conductor wires may be provided with an insulation layer. The insulation layer may be removed at least from parts of the first side surface and the second side surface before starting with the first step (i) and/or the second step (ii).

After forming a first molten pool the laser beam may be guided to the second end surface in a straight path.

After performing the first step (i) and before performing the second step (ii) the laser beam may be guided to the second end surface, preferably in a straight path. Preferably, the laser is in operation during this movement, such that step (iii) is performed.

The first substantially closed path and/or second substantially closed path may be circular.

The first and/or the second molten pool may have circular surfaces.

The third substantially closed path may be elliptical.

The ellipse may be arranged between and tangentially to the first molten pool and to the second molten pool.

Preferably, the minor axis of the ellipse is smaller than the diameter of the conductor wires or smaller than the shorter lengths of a rectangular contour of the conductor wires. Hence the path stays well inside of a contour surrounding the first end surface and the second end surface.

Molten material may reach a gap between the conductor wires but does not flow out of a contour connecting the two conductor wires.

The first step (i), the second step (ii) and/or the fourth step (iv), wherein the laser beam is applied in substantially closed paths, may be repeated 1 or 2 times in order to supply sufficient energy to the first and second end for melting.

Preferably, the second steps (ii) are performed subsequently to the first steps (i) and the fourth steps (iv) are performed subsequently to the second steps.

Hence, preferably a first molten pool having an appropriate amount of molten material is formed at the first end of the first conductor wire, subsequently a second molten pool having an appropriate amount of molten material is formed at the second end of the second conductor wire and the molten pools are combined to a common amount of molten material forming a connection between the first and the second end as soon as the material has solidified.

In a fifth step (v) the laser beam may be applied in a fourth substantially closed path to the first end surface and to the second end surface surrounding the first closed path, the second closed path and third closed path. The fourth substantially closed path may also be elliptical.

The ellipse may be arranged outside and tangentially to the first molten pool and to the second molten pool.

Preferably, the minor axis of the ellipse of the fourth path is also smaller than the diameter of the conductor wires or smaller than the shorter lengths of a rectangular contour of the conductor wires. Hence, also the fourth path stays well inside of a contour surrounding the first end surface and the second end surface.

By performing the fifth step the amount of melted material may be enlarged. By repeating the fifth step 4-5 times sufficient energy may be supplied to the first and the second end.

The minor and the major axes of the third elliptical path may be continuously increased to reach the fourth path.

To reach the fourth substantially closed path, the laser beam may be guided along a straight line, preferably extending the path of the third step.

The cross-sectional area of the first end of the first conductor wire and/or the cross-sectional area of the second end of the second conductor wire may get smaller toward the end of the respective conductor wire. The ends may be tapered, for example when the ends are sharpened for facilitating insertion into the slots of the core of the dynamo electric machine.

There may be a gap between the first side surface and the second side surface with a growing distance towards the end of the conductor wires.

When generating the first pool and applying the laser beam in a straight path from the first molten pool to the second end the gap may be started to be filled with molten material, wherein material is provided by the first molten pool.

When generating the molten pool within the first end and the molten pool within the second end and when connecting the first and the second pool, the gap may be filled with molten material, wherein material is provided by both of the conductor wire ends. When the gap is filled, the ends are connected.

As the paths remain within the contour of the first and the second ends, the melted material also remains within this contour and mainly fills a gap and connects the ends.

The melted material will not flow out of the contour.

The connection area has a surface which during the connection process points upwards, preferably in an axial direction.

The first and/or second end surface may not be a flat surface. Because in the first and the second step molten pools are generated within the first and the second end surface, the surfaces are flattened during the first step and the second step.

Preferably, the laser is currently in operation and a laser beam is applied to the conductor wires during and between the steps. A continuous operating prevents impacts and/or micro bubbles which could arise, when the laser is switched on.

A device for laser welding conductor wires according to the invention can be used for welding conductor wires arranged in slots of a core of a dynamo electric machine, such as a stator core or an armature or wound rotor core, to form a winding, for example a stator winding.

Preferably the device is a device for performing a method as de-scribed above.

The device comprises at least one laser tool for generating a moveable laser beam and/or applying a moveable laser beam to a first end surface of a first conductor wire and a second end surface of a second conductor wire for welding together the first end of the first conductor wire and the second end of the second conductor wire.

The laser tool may comprise a laser generator and/or a moveable mirror.

The conductor wires, and in particular the core, may be arranged, for example in a holder, such that the laser tool preferably is positionable above the first end surface and the second end surface, which point upwards, in particular axially.

The first and the second ends are positioned adjacently to each other, such that the first side surface and the second side surface face each other, preferably in a radial direction.

The side surfaces may abut or may at least be arranged close to each other.

The device may comprise a pressing device for holding the first and the second end together in a radial and/or circumferential direction.

The device comprises a control unit having an output which is in operative connection with the laser tool, e.g. a line connected or connectable to the laser tool.

The control unit is configured for controlling the laser tool such that the laser beam is applied in a first substantially closed path within the first end surface to form a first molten pool.

In particular the control unit is configured for controlling the laser tool such that the laser beam is moved to the second end surface, preferably in a straight path, after having formed the first pool.

The control unit is configured for controlling the laser tool such that the laser beam is applied in a second substantially closed path within the second end surface to form a second molten pool.

The control unit is configured for controlling the laser tool such that the laser beam is applied in a third substantially closed path to the first end surface and to the second end surface connecting the first molten pool and the second molten pool.

In particular the control unit is configured for controlling the laser tool such that the laser beam is applied in a fourth substantially closed path to the first end surface and to the second end surface surrounding the first closed path, the second closed path and third closed path.

Thus, the control unit is configured for controlling the laser tool such that after the laser beam has been applied in a first substantially closed path within the first end surface to form a first molten pool the laser beam may be applied in a second substantially closed path within the second end surface to form a second molten pool in a step (iia).

A molten pool formed within a respective end surface does not extend to the respective radial surface.

Subsequently the laser beam may be applied in a step (iiia) in a path starting at the first molten pool to the second end surface and/or in a third substantially closed path to the first end surface and to the second end surface thereby connecting the first and second molten pool.

The control unit is configured for controlling the laser tool such that in step (iiia) the laser beam is applied to form a connecting path starting at the first molten pool towards the second end surface crossing the first radial surface and the second radial surface until impinging said second molten pool.

Alternatively, the control unit is configured for controlling the laser tool such that after the laser beam has been applied in a first substantially closed path within the first end surface to form a first molten pool the laser beam may be guided to the second end surface in a step (iiib), by applying the laser beam in a path starting at the first molten pool to the second end surface and/or in a third substantially closed path to the first end surface and to the second end surface. The control unit may be configured for controlling the laser tool such that subsequently, after step (iiib), in a step (iib) the laser beam may be applied in a second substantially closed path within the second end surface to form a second molten pool, such that the path and/or the third substantially closed path connects the first molten pool and second molten pool.

The control unit is configured for controlling the laser tool such that in step (iiib) the laser beam is applied in a connecting path starting at the first molten pool towards the second end surface crossing the first radial surface and the second radial surface.

The control unit is configured for controlling the laser tool such that in step (iib) the laser beam the second molten pool is formed in such a way that said second molten pool do not impinge said second radial surface of said second conductor wire, and said second molten pool impinges said connecting path on the second end surface.

The applied laser energy is not necessarily kept constant. The first and the second step, when the first and the second molten pool are formed, may need more energy than applying the laser beam on the third and fourth substantially closed paths, when the molten pools are connected.

The laser beam is applied with a power of 3-5 kW for 0.15-0.30 seconds, depending on the size of the conductor wires.

Figure 2:
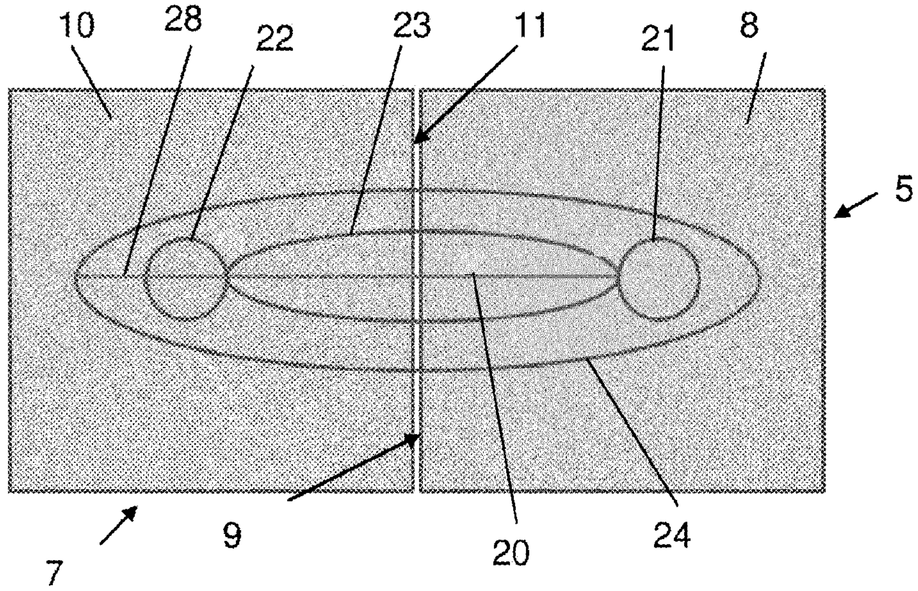
Figure 3:
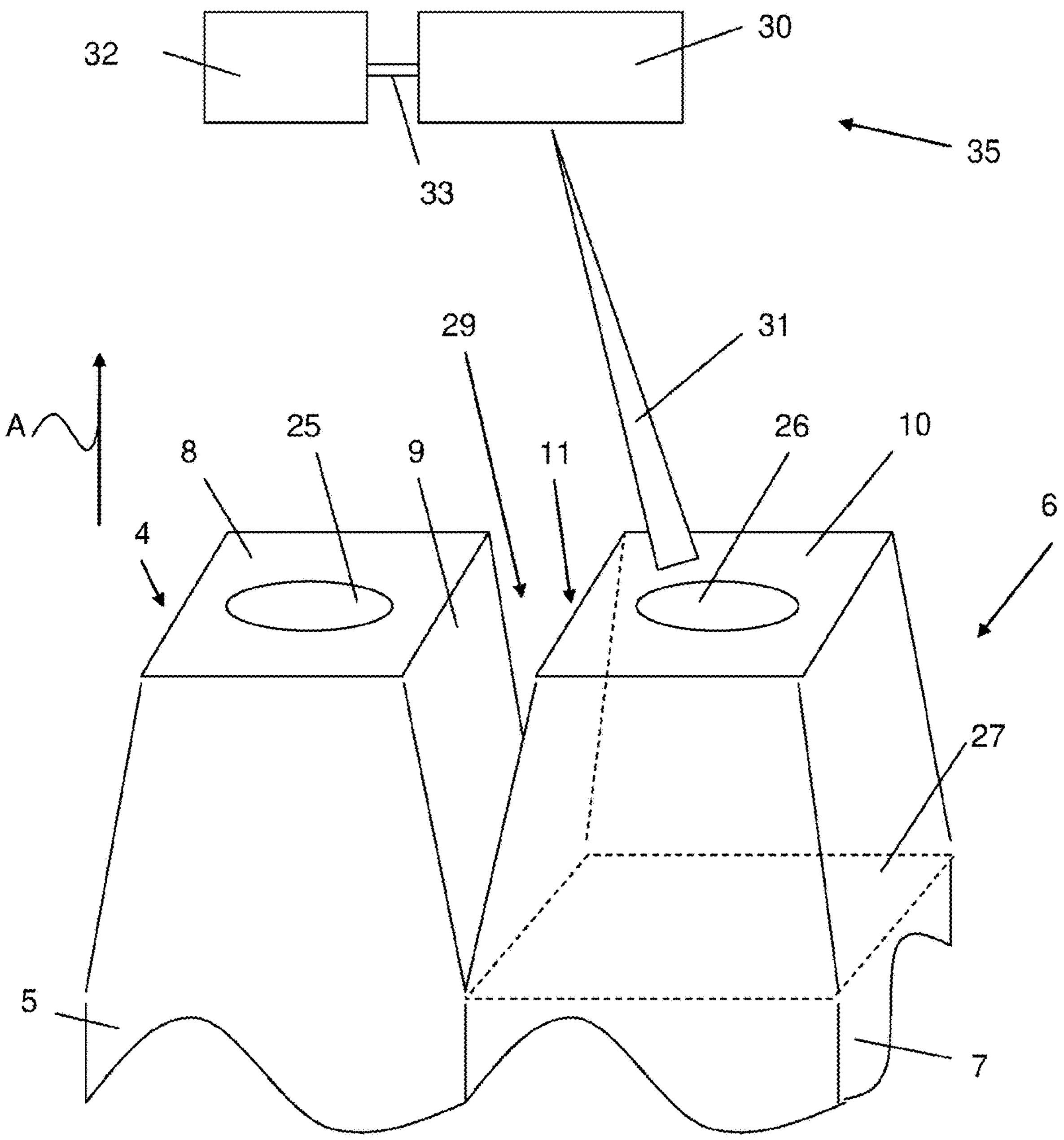

The invention will be explained hereinafter with reference to the description of specific embodiments and the respective drawings, which show FIG. 1 a perspective view of a part of a stator;

FIG. 2 a schematic drawing of welding paths;

FIG. 3 a schematic drawing of a device.

FIG. 1 shows a part of a stator 1 in a perspective view. Conductor wires 5, 7 are arranged in slots 2 of a stator core 3. Pairs of conductor wires 5, 7 have to be connected to form a stator winding.

The stator core 3 is arranged such that the direction of the stator axis A is aligned with the gravitational vector.

A first end 4 of a first conductor wire 5 and a second end 6 of a second conductor wire 7 are arranged adjacent to each other in radial direction.

A first end surface 8 of the first conductor wire 5 and a second end surface 10 of the second conductor wire 7 point upwards.

A laser beam 31 (see FIG. 3) is applied to the first end surface 8 and the second end surface 10 to weld together the first end 4 of the first conductor wire 5 and the second end 6 of the second conductor wire 7.

FIG. 2 is a schematic drawing of welding paths 20, 21, 22, 23, 24.

In a first step (i) a laser beam 31 (see FIG. 3) is applied within the first end surface 8 in a first circular path 21. The circular path 21 is repeated for several times. Once a first molten pool 25 (see FIG. 3) is formed, the laser beam 31 (see FIG. 3) is moved to the second end surface 10 via a straight path 20, while the laser beam 31 is still applied.

In a second step (ii) the laser beam 31 (see FIG. 3) is applied in a second circular path 22 within the second end surface to form a second molten pool 26 (see FIG. 3).

In a further step (iv) the laser beam 31 (see FIG. 3) is applied in a third elliptical path 23 to the first end surface 8 and to the second end surface 10 connecting the first and second molten pool and welding together a first radial surface 9 of the first conductor wire 5 and a second radial surface 11 of the second conductor wire 7.

The third elliptical path may be repeated for at least 1-2 times to increase the depths of penetration of the molten pool in the area of the first radial surface 9 and the second radial surface 11.

The laser beam 31 (see FIG. 3) is then guided to a fourth elliptical path 24 along a straight path 28. The laser beam 31 (see FIG. 3) is applied to the fourth elliptical path 24 to complete the welding. The fourth elliptical path may be repeated for several times, for example for 4-5 times.

FIG. 3 shows a schematic drawing of a device 35 according to the invention.

The device 35 comprises a laser tool 30 for generating and applying a moveable laser beam 31 to the first end surface 8 of the first end 4 of the first conductor wire 5 and the second end surface 10 of the second end 8 of the second conductor wire 7. The device 35 further comprises a control unit 32 having an output line 33 connected to the laser tool 30. The control unit 32 is configured for controlling the laser tool 30 which is arranged above the first end surface 8 and to the second end surface 10 such that the laser beam 31 is applied to the first end surface 8 and to the second end surface 10 in paths as shown in FIG. 2.

The first end 4 of the first conductor wire 5 and the second end 6 of the second conductor wire 7 are tapered.

Thus, the cross-sectional area 27 gets smaller is axial direction A toward the axial end.

Thus, there is a gap 29 between the first radial side surface 9 and the second radial side surface 11.

Until a first molten pool 25 is achieved, the laser beam 31 is not passed through the gap 29, thus avoiding reaching areas having a greater distance to the laser tool 30 and where there is no well-defined power input.

This method allows to weld also conductor wires 5, 7 that are not perfectly in contact with each other. At least one well defined molten pool 25 may be generated and from there molten material may be transported towards the other conductor wire.

This is particularly advantageous in the welding of conductor wires 5, 7 where the ends 4, 6 are very distant from each other.

A process of this type is more controlled because it may be decided how much of melted material is generated in the molten pools 25, 26 before establishing a connection between the molten pools 25, 26.

A fiber laser may be used providing a wavelength of 1000 nm. The laser beam may be moved with a velocity of 150-350 mm/s.

The invention claimed is:

1. A method for laser welding conductor wires to form a winding, wherein a first end of a first conductor wire and a second end of a second conductor wire are arranged adjacent to each other, and a laser beam is applied to a first end surface of the first conductor wire and a second end surface of the second conductor wire to weld together the first end of the first conductor wire and the second end of the second conductor wire, the first end surface, and the second end surface, the method comprising:

applying a laser beam in a first path within the first end surface to form a first molten pool; and after applying the laser beam in the first path, performing, in either order:

(a) applying the laser beam in a second path within the second end surface to form a second molten pool; and (b) applying the laser beam in at least one of (1) a path starting at the first molten pool and extending to the second end surface, and (2) a third path extending over the first end surface and the second end surface;

wherein:

each of the first path, the second path, and the third path encompasses at least a respective angle of 270°, and the first and second molten pools are connected by the at least one of (1) the path starting at the first molten pool to the second end surface, and (2) the third path extending over the first end surface and the second end surface.

2. The method according to claim 1, wherein the conductor wires are arranged in slots of a core of a dynamo electric machine.

3. The method according to claim 1, wherein the first end surface and the second end surface point upwards.

4. The method according to claim 1, wherein the first end surface and the second end surface are axial end surfaces.

5. The method according to claim 1, wherein after forming the first molten pool the laser beam is guided to the second end surface in a straight path.

6. The method according to claim 1, wherein at least one of the first path and the second path is circular.

7. The method according to claim 1, wherein the third path is elliptical.

8. The method according to claim 1, wherein any one or more of:

the applying the laser beam in the first path within the first end surface to form the first molten pool, the applying the laser beam in the second path within the second end surface to form the second molten pool, the applying the laser beam in the path starting at the first molten pool and extending to the second end surface, or the applying the laser beam in the third path extending over the first end surface and the second end surface, is repeated at least one time.

9. The method according to claim 1, further comprising applying the laser beam in a fourth path to the first end surface and to the second end surface surrounding the first path, the second path and third path, wherein the fourth path encompasses at least a respective angle of 270°.

10. The method according to claim 9, wherein the fourth path is elliptical.

11. The method according to claim 1, wherein at least one of the cross-sectional area of the first end of the first conductor wire and the cross-sectional area of the second end of the second conductor wire gets smaller towards the axial end.

12. A device for laser welding conductor wires to form a winding, for laser welding conductor wires to form a winding, wherein a first end of a first conductor wire and a second end of a second conductor wire are arranged adjacent to each other, and a laser beam is applied to a first end surface of the first conductor wire and a second end surface of the second conductor wire to weld together the first end of the first conductor wire and the second end of the second conductor wire, the first end surface, and the second end surface, the device comprising:

at least one laser tool for one or more of generating or applying a moveable laser beam to a first end surface of a first conductor wire and a second end surface of a second conductor wire for welding together the first end of the first conductor wire and the second end of the second conductor wire; and a control unit having an output in operative connection with the laser tool; wherein:

the control unit is configured for controlling the laser tool to cause the laser tool to apply the laser beam in a first path within the first end surface to form a first molten pool, and the control unit is further configured to cause the device to perform, in either order after applying the laser beam in the first path, one or more of the following:

(a) applying the laser beam in a second path within the second end surface to form a second molten pool; and (b) applying the laser beam in at least one of (1) a path starting at the first molten pool and extending to the second end surface, and (2) a third path extending over the first end surface and the second end surface;

wherein:

each of the first path, the second path, and the third path encompasses at least a respective angle of 270°, and the first and second molten pools are connected by the at least one of (1) the path starting at the first molten pool to the second end surface, and (2) the third path extending over the first end surface and the second end surface.

13. The device according to claim 12, wherein the control unit is configured for controlling the laser tool to cause the laser tool to apply the laser beam in a fourth path to the first end surface and to the second end surface surrounding one or more of the first path, the second path, or third path, wherein the fourth path encompasses at least a respective angle of 270°.

* * * * *